(12) United States Patent
Paiam

(10) Patent No.: US 6,252,716 B1
(45) Date of Patent: Jun. 26, 2001

(54) BULK OPTIC INTERLEAVER

(75) Inventor: Reza Paiam, Ottawa (CA)

(73) Assignee: JDS Uniphase Photonics C.V., Arnhem (NL)

( * ) Notice: Subject to any disclaimer, the term of this patent is extended or adjusted under 35 U.S.C. 154(b) by 0 days.

(21) Appl. No.: 09/409,434

(22) Filed: Sep. 30, 1999

Related U.S. Application Data

(63) Continuation-in-part of application No. 09/383,069, filed on Aug. 26, 1999.

(30) Foreign Application Priority Data

Jul. 22, 1999 (CA) .................................................. 2278358

(51) Int. Cl.$^7$ ............................. G02B 27/10; G02B 6/26; H04J 14/00; G02F 1/295
(52) U.S. Cl. ...................... 359/618; 359/115; 359/116; 359/117; 359/620; 385/27; 385/9
(58) Field of Search .................................. 359/115, 116, 359/117, 620, 618; 385/9, 27

(56) References Cited

U.S. PATENT DOCUMENTS 6,125,220 * 9/2000 Copner .................................... 385/27

* cited by examiner

*Primary Examiner*—Georgia Epps
*Assistant Examiner*—Michael A. Lucas
(74) *Attorney, Agent, or Firm*—Neil Teitelbaum

(57) ABSTRACT

An optical device is disclosed for interleaving or de-interleaving optical channels. A beam splitter combiner provides the function of splitting an incoming beam into two sub-beams which are then fed respectively to a first and second different GT resonator. The GT resonators provide a feedback signal in response to receiving the first and second sub-beams of light, respectively, to the beam splitter/combiner.

11 Claims, 9 Drawing Sheets

Thermal Change of Optical Pathlength in Bulk Material

Optical pathlength: $S = n.l$
$dS/dT = (dn/dT).l + (dl/dT).n$
$dS/(dT.S) = dn/(dT.n) + \alpha$
$dS/(dT.S) \sim -0.5\gamma/1.5 + 1/3.\gamma$    For Polymers
$dS/(dT.S) \sim 0$

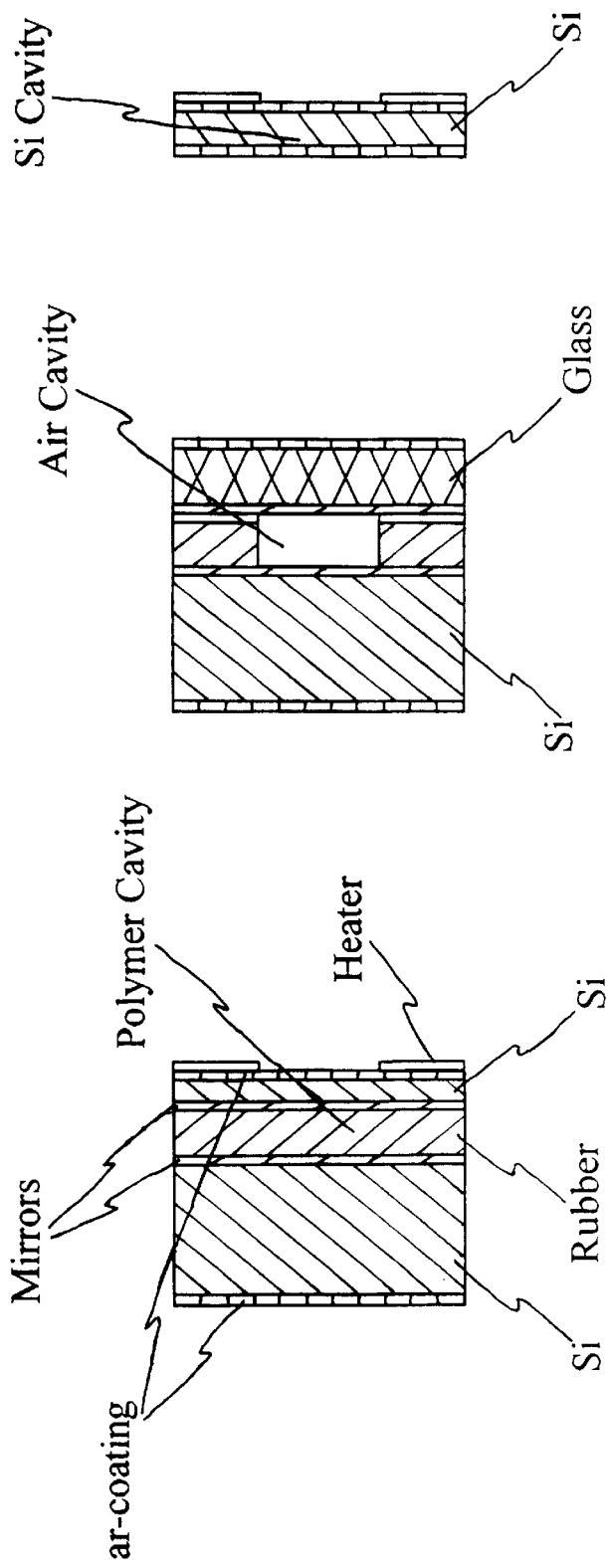

BULK OPTIC INTERLEAVER

This application is a continuation-in-part application of U.S. Pat. No. 09/383,069 filed Aug. 26, 1999 entitled OPTICAL INTERLEAVER/DE-INTERLEAVER.

FIELD OF THE INVENTION

This invention relates to generally to a multi-port optical cavity and more particularly to an optical cavity having at least two-ports and use thereof.

BACKGROUND OF THE INVENTION

Using optical signals as a means of carrying channeled information at high speeds through an optical path such as an optical waveguide i.e. optical fibres, is preferable over other schemes such as those using microwave links, coaxial cables, and twisted copper wires, since in the former, propagation loss is lower, and optical systems are immune to Electro-Magnetic Interference (EMI), and have higher channel capacities. High-speed optical systems have signaling rates of several mega-bits per second to several tens of giga-bits per second.

Optical communication systems are nearly ubiquitous in communication networks. The expression herein "Optical communication system" relates to any system that uses optical signals at any wavelength to convey information between two points through any optical path. Optical communication systems are described for example, in Gower, Ed. Optical communication Systems, (Prentice Hall, N.Y.) 1993, and by P. E. Green, Jr in "Fiber optic networks" (Prentice Hall N.J.) 1993, which are incorporated herein by reference.

As communication capacity is further increased to transmit an ever-increasing amount of information on optical fibres, data transmission rates increase and available bandwidth becomes a scarce resource.

As communication capacity is further increased to transmit an ever-increasing amount of information on optical fibres, data transmission rates increase and available bandwidth becomes a scarce resource.

High speed data signals are plural signals that are formed by the aggregation (or multiplexing) of several data streams to share a transmission medium for transmitting data to a distant location. Wavelength Division Multiplexing (WDM) is commonly used in optical communications systems as means to more efficiently use available resources. In WDM each high-speed data channel transmits its information at a pre-allocated wavelength on a single optical waveguide. At a receiver end, channels of different wavelengths are generally separated by narrow band filters and then detected or used for further processing. In practice, the number of channels that can be carried by a single optical waveguide in a WDM system is limited by crosstalk, narrow operating bandwidth of optical amplifiers and/or optical fiber non-linearities. Moreover such systems require an accurate band selection, stable tunable lasers or filters, and spectral purity that increase the cost of WDM systems and add to their complexity. This invention relates to a method and system for filtering or separating closely spaced channels that would otherwise not be suitably filtered by conventional optical filters. More particularly, this invention provides a filter and method of interleaving and de-interleaving optical channels in an optical transmission system.

Currently, internationally agreed upon channel spacing for high-speed optical transmission systems, is 100 Ghz, equivalent to 0.8 nm, surpassing, for example 200 Ghz channel spacing equivalent to 1.6 nanometers between adjacent channels. Of course, as the separation in wavelength between adjacent channels decreases, the requirement for more precise demultiplexing circuitry capable of ultra-narrow-band filtering, absent crosstalk, increases. The use of conventional dichroic filters to separate channels spaced by 0.4 nm or less without crosstalk, is not practicable; such filters being difficult if not impossible to manufacture.

In a paper entitled Multifunction optical filter with a Michelson-Gires-Turnois interferometer for wavelength-division-multiplexed network system applications, by Benjamin B. Dingle and Masayuki Izutsu published 1998, by the Optical Society of America, a device hereafter termed the GT device provides some of the functionality provided by the instant invention. For example, the GT device as exemplified in FIG. 1 serves as a narrow band wavelength demultiplexor; this device relies on interfering a reflected E-field with an E-field reflected by a plane mirror 16. The etalon 10 used has a 99.9% reflective back reflector 12r and a front reflector 12f having a reflectivity of about 10%; hence an output signal from only the front reflector 12f is utilized. A beam splitting prism (BSP) 18 is disposed to receive an incident beam and to direct the incident beam to the etalon 10. The BSP 18 further receives light returning from the etalon and provides a portion of that light to the plane mirror 16 and a remaining portion to an output port. Although the GT device appears to perform its intended function, it appears to have certain limitations: the prior art GT device requires a finite optical path difference in the interferometer to produce an output response that mimics the one provided by the device of the instant invention. Typically for a 50 GHz free spectral range (FSR) this optical path difference would be a few millimeters; in contrast in the instant invention the optical phase difference need only be a fraction of a wavelength, i.e. approximately $\lambda/4$ resulting in a more temperature stable and insensitive system. One further limitation of the prior art GT device of FIG. 1, is its apparent requirement in the stabilization of both the etalon and the interferometer. Yet a further drawback to the prior GT device is the requirement for an optical circulator to extract the output signal from the input waveguide adding to signals loss and increased cost of the device.

The free spectral range of a GT resonator is given by $FSR_{GT}=c/(2d)$, where c is the speed of light in a vacuum and d is the optical length of the resonator cavity. The free-spectral-range of the spectral response of the device shown in FIG. 1 is $FSR_{interleaver}=c/d$.

The required optical length difference between the two arms of the Michelson interferometer shown in FIG. 1 is l1–l2=d/2. Since the optical path length difference (l1–l2) is proportional to the optical length of the resonator cavity, d, and since d required for an interleaver having a FSR of 100 GHz is about 1.5 mm (or for an FSR of 50 GHz is about 3 mm), GT interleaver is highly temperature sensitive. Hence, one known disadvantage of the GT device shown in FIG. 1, is the requirement for temperature stabilization of both the etalon 10, as well as the considerable path length difference between the two arms of the interferometer.

It is an object of this invention to provide a method and circuit for separating an optical signal having closely spaced channels into at least two optical signals wherein channel spacing between adjacent channels is greater in each of the at least two optical signals, thereby requiring less precise filters to demultiplex channels carried by each of the at least two signals.

The present invention is believed to overcome many of the limitations of the prior art GT device and of other known multiplexing and demultiplexing devices.

It is an object of this invention to provide a relatively inexpensive optical circuit for interleaving or de-interleaving optical channels wherein control of the circuit operation is provided.

It is an object of this invention to provide an etalon based device wherein output signals from two oppositely disposed ports can be controllably interferometrically combined to yield a desired output response.

SUMMARY OF THE INVENTION

In accordance with the invention, there is provided, a multiplexor/demultiplexor comprising:
  a beam splitter for splitting a beam into a first and a second sub-beam of light;
  a first GT resonator disposed to receive the first sub-beam of light;
  a second GT resonator disposed to receive the second sub-beam of light; and
  a beam combiner for combining light output from the first and second GT resonators.

In accordance with the invention, there is provided, a multiplexor/demultiplexor comprising:
  a beam splitter/combiner for splitting a beam launched therein in from a first location into a first and a second sub-beam of light and for combining received sub-beams launched from other locations therein into a single beam of light;
  a first GT resonator disposed to receive the first sub-beam of light from the beam splitter/combiner; and
  a second GT resonator disposed to receive the second sub-beam of light from the beams splitter/combiner, the resonators providing a feedback signal in response to receiving the first and second sub-beams of light, respectively, to the beam splitter/combiner.

In accordance with another aspect of the invention, there is provided, a method of de-multiplexing an optical signal into or de-interleaved light channels, comprising the steps of:
  splitting a beam of light comprising a plurality of light channels launched therein in from a first location into a first and a second sub-beam of light in a wavelength and polarization independent manner,
  providing the first sub-beam to a first GT resonator disposed to receive the first sub-beam of light;
  providing the second beam of light to a second GT resonator disposed to receive the second sub-beam of light,
  receiving a first output signal from the first GT resonator; and,
  receiving a second output signal from the second GT resonator, wherein the first and second output signals are de-interleaved light channels.

BRIEF DESCRIPTION OF THE DRAWINGS

Exemplary embodiments of the invention will now be described in conjunction with the drawings in which:

FIGS. 4 and 5 correspond to an interleaver that has been designed to be symmetric;

FIG. 11 is a diagram of a thermo-optic Fabry-Perôt tunable filter in accordance with an aspect of this invention;

FIG. 12 is a diagram of a an alternative embodiment of a thermo-optic Fabry-Perôt tunable filter in accordance with an aspect of this invention;

FIG. 13 is a diagram of a an alternative embodiment of a thermo-optic Fabry-Perôt tunable filter in accordance with an aspect of this invention; and, FIG. 14 is diagram an alternative more compact embodiment of the invention.

DETAILED DESCRIPTION

Figure 1:
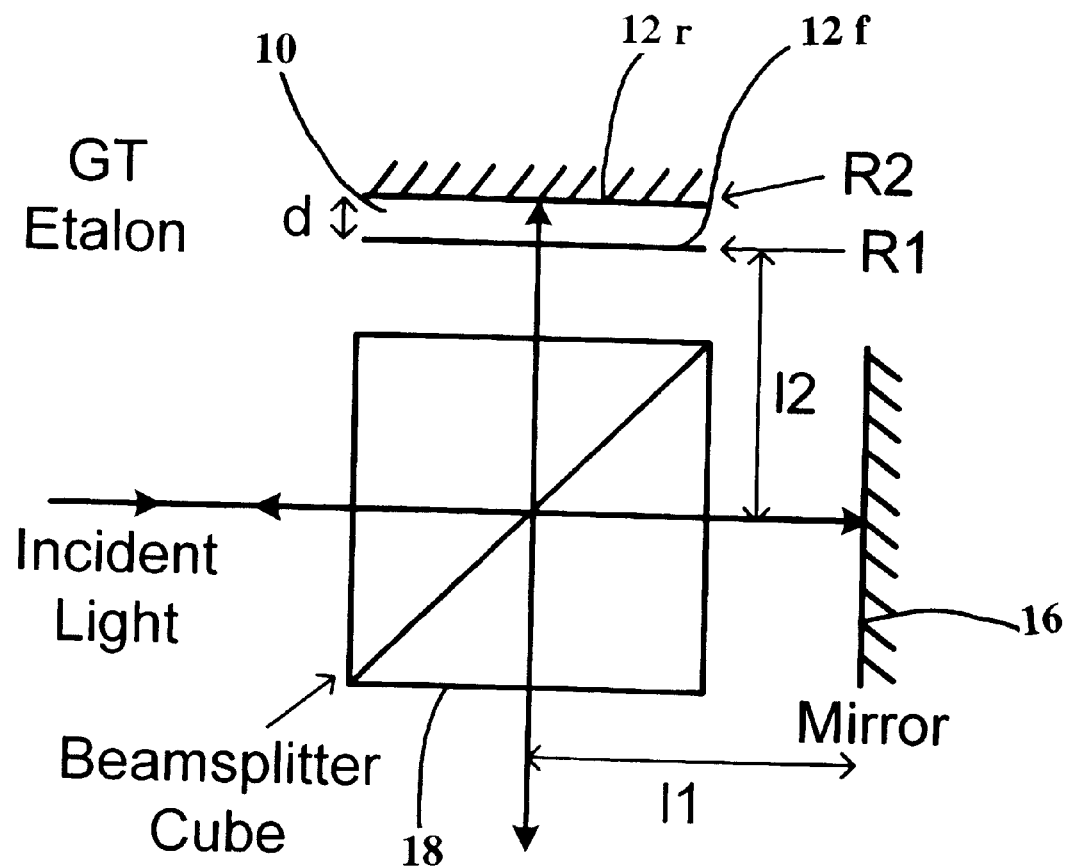
FIG. 1 is a circuit block diagram of a prior art Michelson-Gires-Tournois interferometer.
Figure 2:
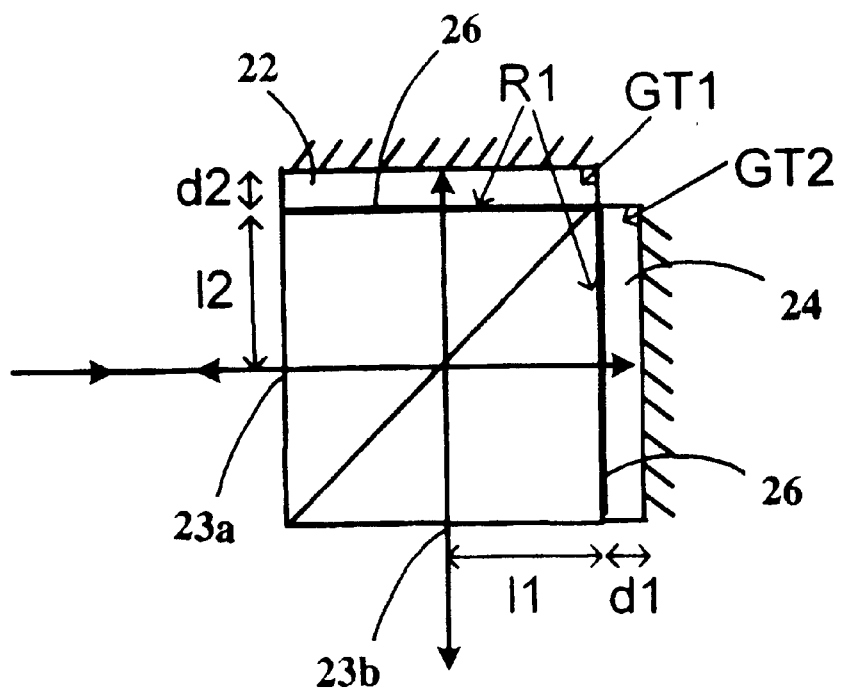
FIG. 2 is a circuit block diagram of a 2-port GT interleaver/de-interleaver circuit in accordance with this invention.

Referring now to FIG. 2, an interleaver/de-interleaver circuit in accordance with this invention is shown, wherein two GT etalons 22 and 24, each having a different free-spectral range (FSR) are directly coupled with a wavelength independent, polarization insensitive 50/50 beam splitting cube 18. The FSR of this device is given by $FSR_{Interleaver} = c/(d_1+d_2)$, where c is the speed of light in a vacuum and $d_1$ and $d_2$ are the optical path lengths of the two GT resonator cavities. The selection of values of $d_1$ and $d_2$ determine whether the interleaver will be symmetric or asymmetric. The optical length difference between the two arms of the interferometer and the reflectivity $R_1$ of the front fact of the GT resonators 22 and 24 depend upon the choice of values of $d_1$ and $d_2$. In the instance where the difference in path length between the two cavities $d_2-d_1=(p/2+¼)\lambda$, where $\lambda$ is the wavelength and p is an integer, the device provides interleaving/de-interleaving that results in symmetric odd and even channels; hence the channels are all of substantially the same bandwidth. A reflectivity $R_1$ of the both front partially transmissive reflectors 26 of the two GT etalons 22 and 24 is selected to be 0.18 and the optical length difference between the two arms of the cube is equal to $l_1-l_2=(q/4=⅛)\lambda$, where q is an integer. In the optimum case, p=0 and q=0. However reflectivities of 0.17 to 0.19 have been found to be suitable for symmetric interleavers. The interleaver is asymmetric for all other values of $d_2-d_1$; as a general rule, for the asymmetric interleaver, the length difference $(l_2-l_1)$ would be slightly smaller than $d_2-d_1$ if $(d_2-d_1)<\lambda/4$, and the length difference would be slightly larger than $d_2-d_1$ if $(d_2-d_1)>\lambda/4$. Simulation has indicated that reflectivities of up to 30 percent are suitable for values of $R_1$ for asymmetric interleavers.

Figure 3:
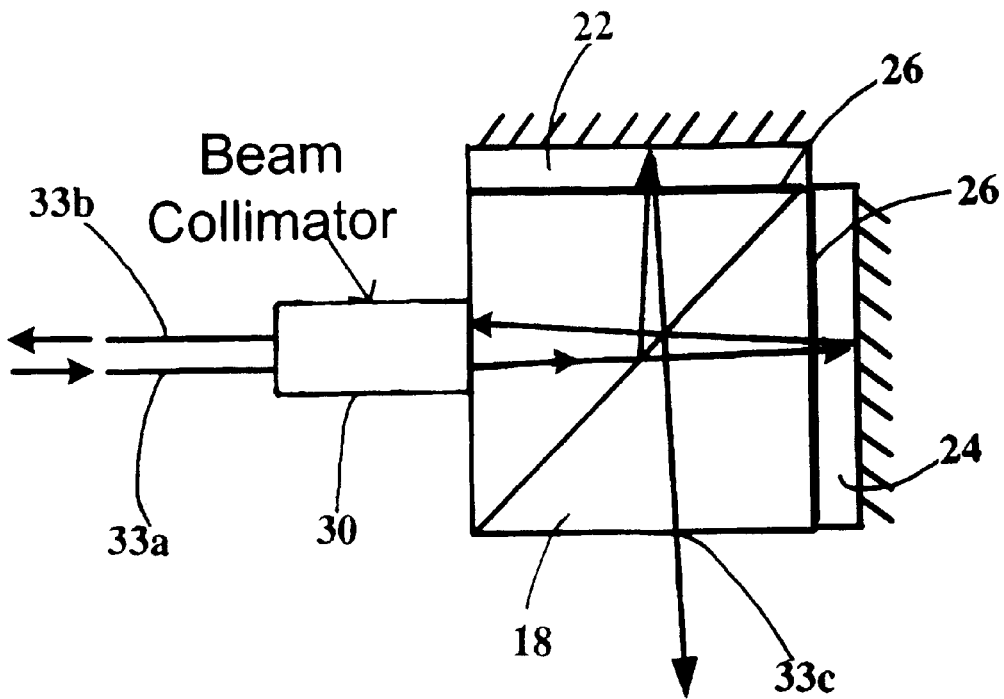
FIG. 3 is an alternative embodiment of a 3-port GT interleaver/de-interleaver circuit in accordance with this invention.

FIG. 3 shows an alternative embodiment of an interleaver circuit in accordance with this invention similar to FIG. 2, however having an input beam being launched via a beam collimator in the form of a graded-index (GRIN) lens 30 at an angle rather than being normal to the end face of the beam splitting cube 18. This substantially lessens the complexity of the optical circuit by providing one input port 33a and two separate output ports 33b and 33c. In contrast, the circuit shown in FIG. 2 has one input/output port 23a and one output port 23b; to couple light outward from the output end of the input/output port an optical circulator or out-coupling device is required, adding to the cost and complexity of the device. Of course, it should be realized, that when the circuit of FIG. 3 is being used as an interleaver instead of a de-interleaver, the two output ports 33b and 33c serve as input ports, and the input port 33a serves as an output port for carrying an interleaved stream of channels. Although the circuit of FIG. 2 is not shown having a beam collimating/focusing lens coupled to ports 23a and 23b, the circuit requires such a lens at each port for coupling between the beam splitting cube and optical waveguides. In the circuit of FIG. 2 light is launched along an optical axis of such a lens. In FIG. 3, the positioning of the ports equidistant and offset by a predetermined amount at the outward end face of the beam collimator 30 provides the required angle.

Figure 4:
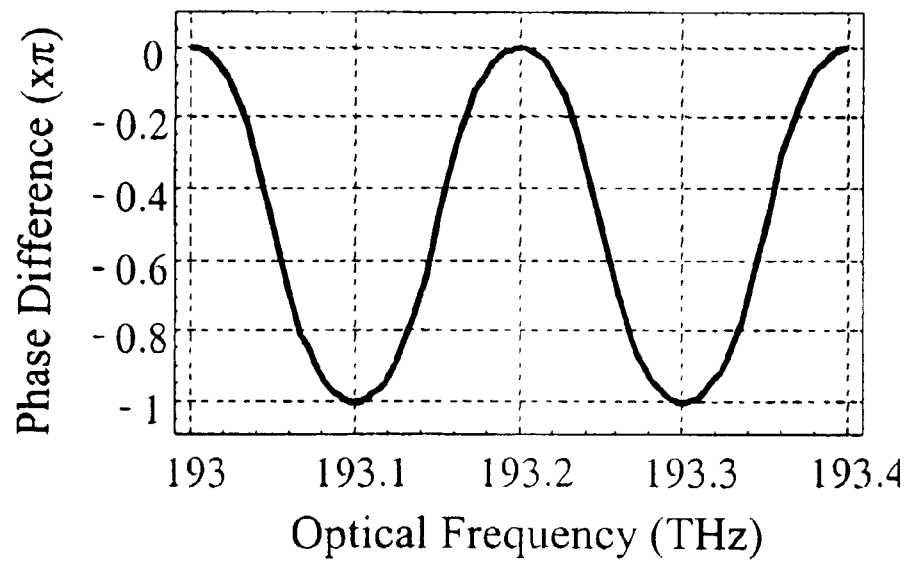
FIG. 4 is a plot of phase difference versus optical frequency.
Figure 5:
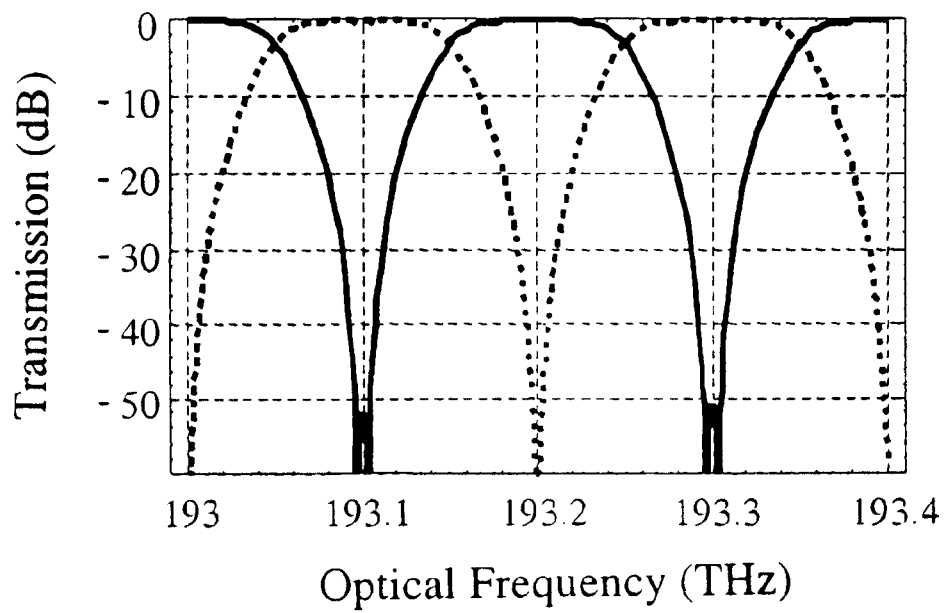
FIG. 5 is a plot illustrating shows the spectral transmissions of the two de-interleaved signals the outputs of the device.

Turning now to FIG. 4, a graph is shown illustrating the phase difference between the two optical fields received at each output port of the device of FIG. 3. The phase difference alternates between 0 and +π. FIG. 5 shows the spectral transmissions of the two de-interleaved signals the outputs of the device. FIGS. 4 and 5 correspond to an interleaver that has been designed to be symmetric.

Figure 6:
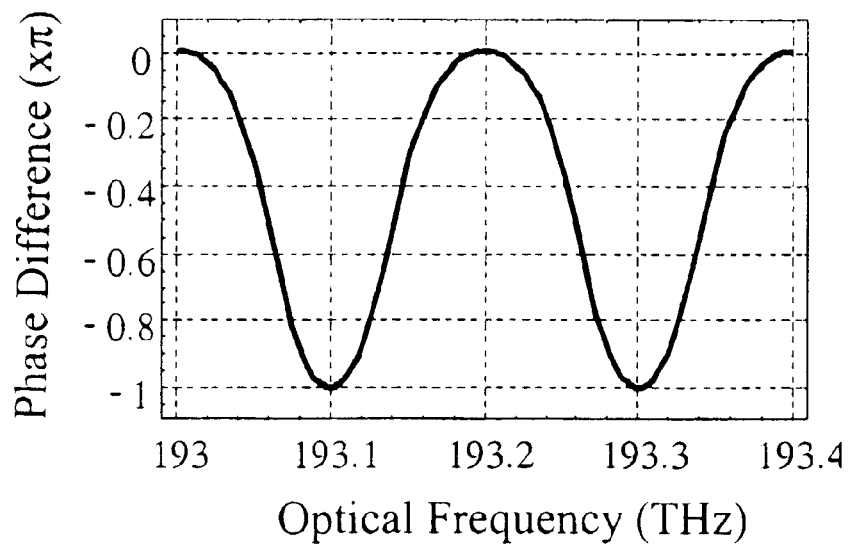
FIGS. 6 and 7 are plots that correspond to a device having asymmetric channels.
Figure 7:
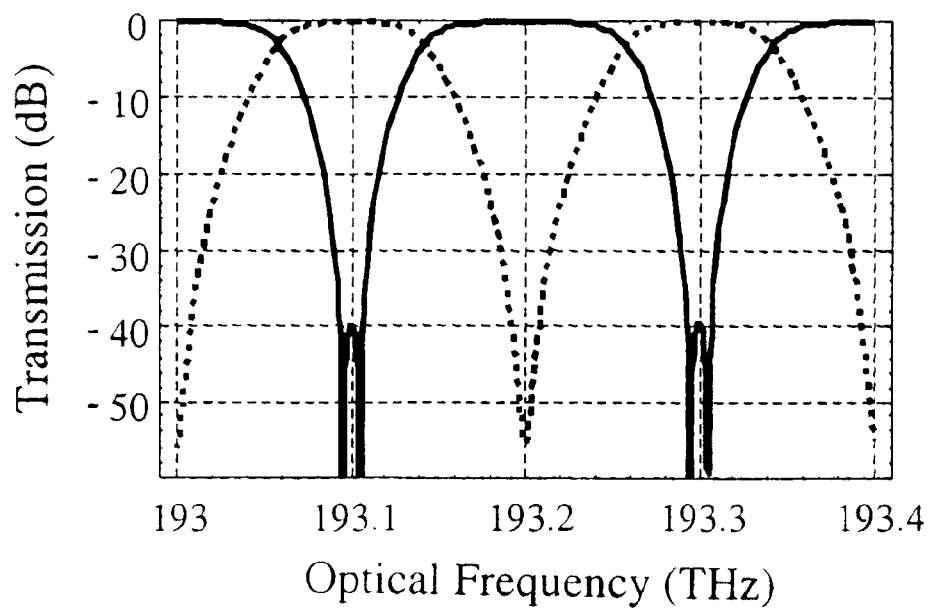

FIGS. 6 and 7 correspond to a device having asymmetric channels.

Figure 8:
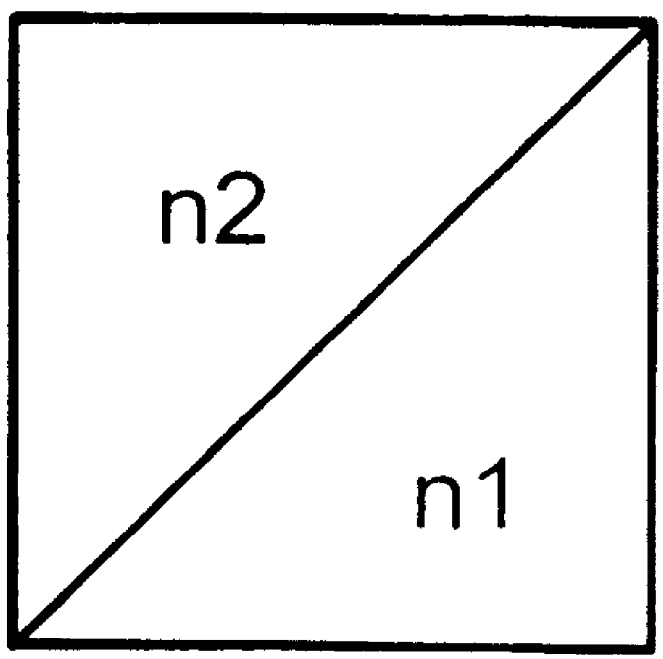
FIG. 8. illustrates an alternative embodiment of the invention is shown in wherein a beam splitting cube is made up of two portions, a first being of a refractive index n1 and a second being of a refractive index n2 wherein, the physical lengths of the two halves are equal, however the optical path lengths are slightly different as required.

An alternative embodiment of the invention is shown in FIG. 8. wherein a beam splitting cube is made up of two portions, a first being of a refractive index n1 and a second being of a refractive index n2. Here, the physical lengths of the two halves are equal, however the optical path lengths are slightly different as required.

Figure 9:
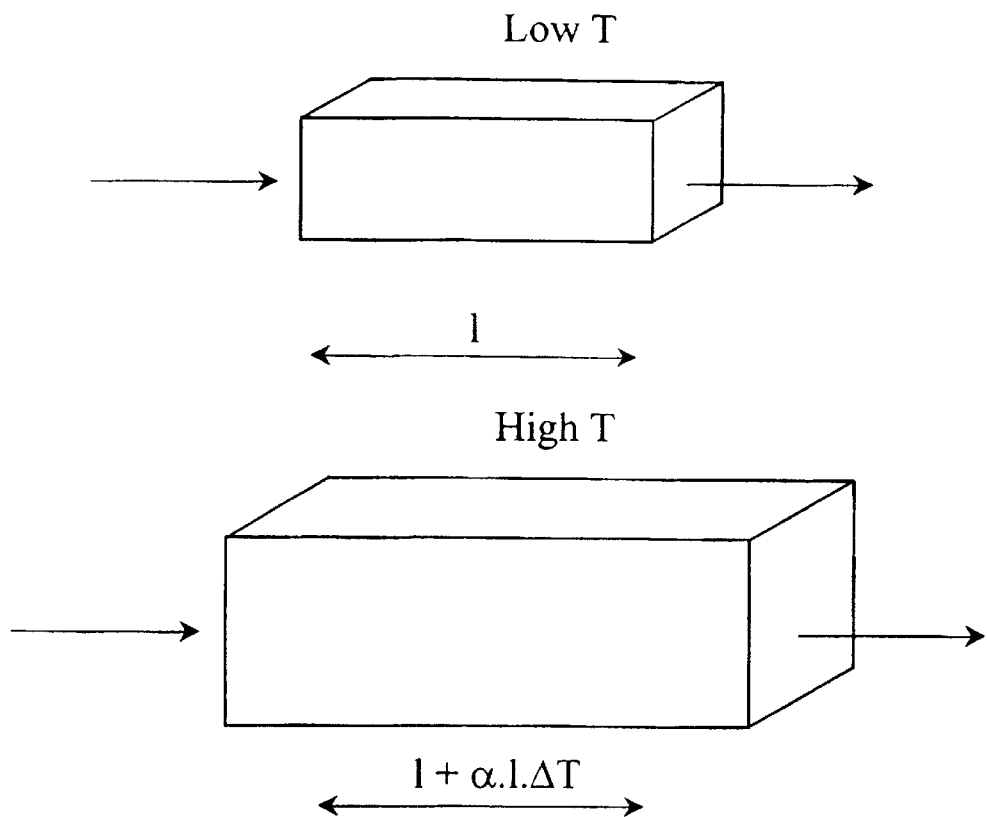
FIGS. 9 and 10 illustrate another feature of polymer materials. Their path length change with temperature change is quite significant. In fact this property can be used in combination with glass or silica to fabricate hybrid thermo-optically tunable Fabry-Perôt tunable filters.
Figure 10:
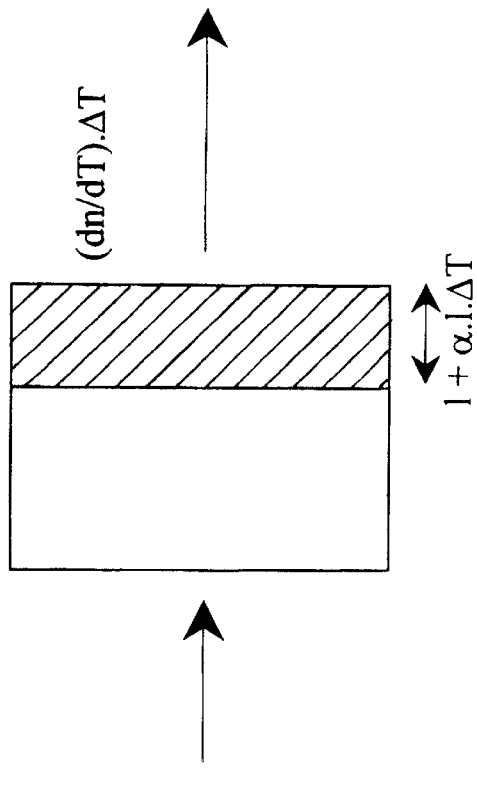

FIGS. 9 and 10 illustrate another feature of polymer materials. Their path length change with temperature change is quite significant. In fact this property can be used in combination with glass or silica to fabricate hybrid thermo-optically tunable Fabry-Perôt tunable filters.

In FIGS. 11 and 12 two Fabry-Perôt etalons are shown wherein a rubbery polymer expandable with the application of heat is utilized as a means of varying the gap between two reflective surfaces. Silicon is used as a heat-sink so that the response time of the device may be increased. Thus when heat is no longer applied, the silicon will provide a means of quickly conducting this heat energy to the case to which it is bonded. Or stated differently, the provision of the heat sink assists in bringing the polymer to ambient temperature.

The thermal expansion of the rubbery polymer film is enhanced (by a factor of 3) due to the fact that the film cannot expand in-plane because it is coupled to a non-expanding substrate. The high Poisson modulus of polymers and especially rubbery polymers enhances the out-of-plane expansion to let the volume expansion fully take place.

By utilizing the properties of the rubbery polymer film described above, the interleaver/de-interleaver can be tuned to provide an device having an asymmetric output signal from a device that was symmetric in output response, or vice versa. The center wavelength can be tuned by varying the FSR; these two are related and one cannot be changed without varying the other one.

Thus, on a limited scale, tuning to achieve symmetric or asymmetric channels can be achieved by varying the thickness the gaps on both GT etalons; if the center wavelength is already at the right position, the size of both gaps should be changed to keep the center wavelength fixed. However, tuning for symmetry or asymmetry on a larger scale requires changing $(l_1-l_2)$ and the reflectivity $R_1$ as well as the two gaps.

Figure 14:
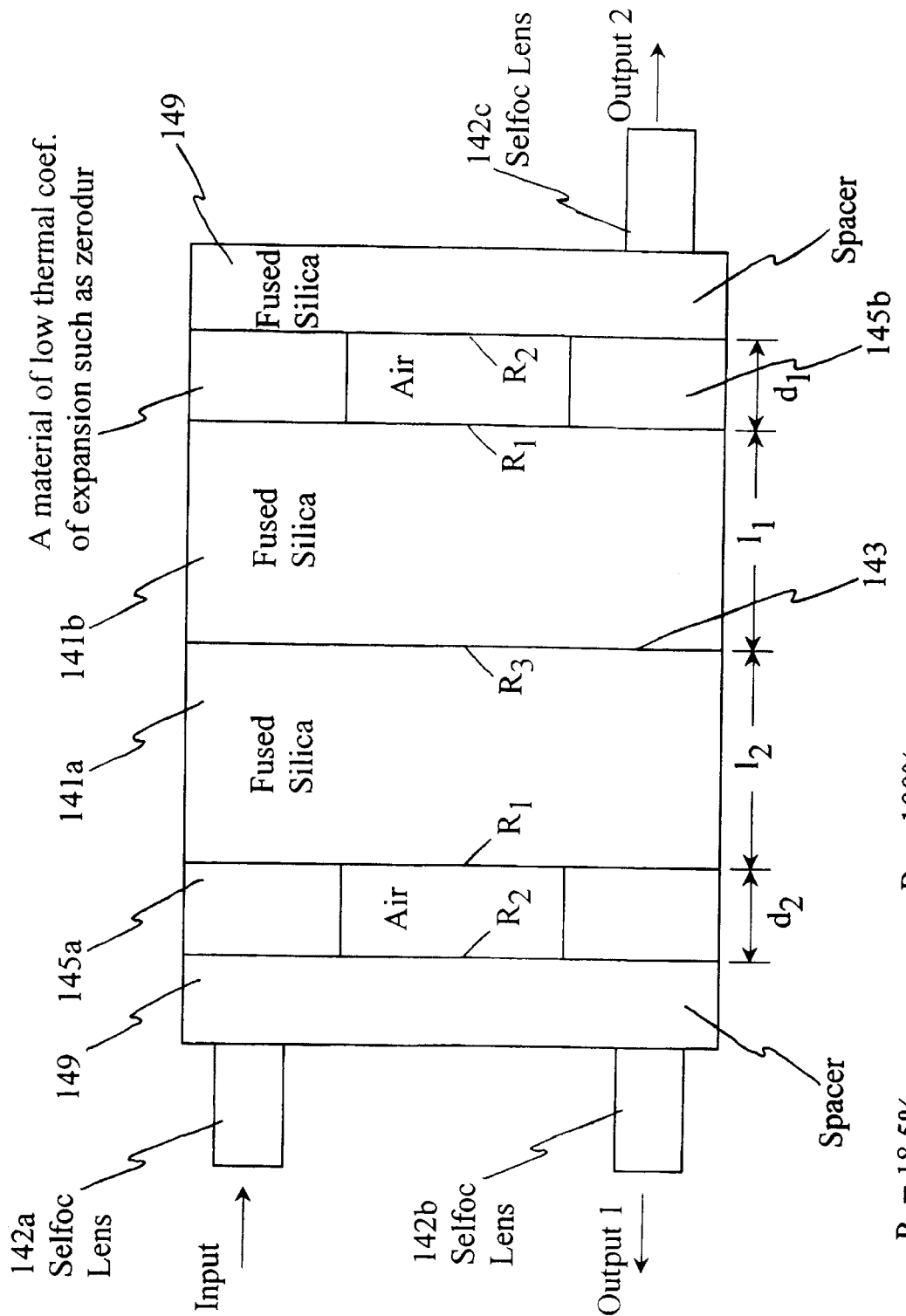

Turning now to FIG. 14 an alternative embodiment of the invention is shown. Two blocks 141a and 141b of fused silica having a reflective 50/50 coating 143 is disposed therebetween forming two beam splitters/combiners that are utilized to direct an input beam to two GT etalons 145a and 145b disposed beside the two blocks. A spacer block 149 separates each etalon and the input output1 and output2 lenses. The etalons 145a and 145b are comprised of a spacer element made of a material such as zerodur having a low thermal coefficient of expansion. Each etalon also has a fully reflective end face having a reflectance R2=100% and an opposing surface having a reflectance R1=18.5%. The etalon 145a has a gap defined by the spacer 145a of d2, and the etalon 145b has a gap defined by the spacer 145b of d1. The length of the fused silica blocks 141a and 141b are l2 and l1 respectively. The relationships between d1 and d2 are such that $d2-d1=(p/2+¼)\lambda$. The relationship between l1 and l2 are such that $l1-l2=(q/4+⅛)\lambda$, where $\lambda=1546$ nm in free space. Input and output ports are disposed at output end faces of Selfoc graded index lenses 142a, 142b, and 142c.

The operation of the circuit of FIG. 14 is as follows. A beam of light incident upon the GRIN lens 142a of its optical axis is directed at an angle through the lens and through its optical axis as it exits the lens. The beam impinges the reflective coating of the beam splitting filter at 143 where half of the beam is reflected backwards while the other half continues along a straight through path into the etalon 145b. The reflected light that is reflected from the filter 143 is directed into the GT etalon 145a. After the two beams pass through the respective etalons they are reflected outward and combine at the filter 143 and are directed to respective output ports 142b and 142c.

Although the configuration of the optical circuit shown in FIG. 14 is different than that shown in previous embodiments, the functionality and basic components are the same.

What is claimed is:

1. A multiplexor/demultiplexor comprising:
    a beam splitter for splitting a beam into a first and a second sub-beam of light;
    a first GT resonator disposed to receive the first sub-beam of light;
    a second GT resonator disposed to receive the second sub-beam of light; and
    a beam combiner for combining light output from the first and second GT resonators.

2. A multiplexor/demultiplexor as defined in claim 1, wherein at least one of the GT resonators are comprised of a polymer that is sensitive to temperature for controllably varying a gap between two reflective surfaces of at least one of the first and second GT resonators.

3. A multiplexor/demultiplexor as defined in claim 2, further comprising a control circuit for controlling the temperature about the polymer to controllably vary the gap of at least one of the first and second GT resonators.

4. A multiplexor/demultiplexor as defined in claim 3 wherein the control circuit includes a heater for raising the temperature of the polymer.

5. A multiplexor/demultiplexor comprising:
    a beam splitter/combiner for splitting a beam launched therein in from a first location into a first and a second sub-beam of light and for combining received sub-beams launched from other locations therein into a single beam of light;

a first GT resonator disposed to receive the first sub-beam of light from the beam splitter/combiner; and a second GT resonator disposed to receive the second sub-beam of light from the beams splitter/combiner, the resonators providing a feedback signal in response to receiving the first and second sub-beams of light, respectively, to the beam splitter/combiner.

6. A multiplexor/demultiplexor as defined in claim 5, wherein at least one of the GT resonators comprise a material having a path length change with temperature to provide a tunable hybrid thermo-optically Fabry-Perôt filter.

7. A method of de-multiplexing an optical signal into or de-interleaved light channels, comprising the steps of:

splitting a beam of light comprising a plurality of light channels launched therein in from a first location into a first and a second sub-beam of light in a wavelength and polarization independent manner, providing the first sub-beam to a first GT resonator disposed to receive the first sub-beam of light;

providing the second beam of light to a second GT resonator disposed to receive the second sub-beam of light, receiving a first output signal from the first GT resonator; and, receiving a second output signal from the second GT resonator, wherein the first and second output signals are de-interleaved light channels.

8. A method as defined in claim 7, further comprising the step thermo-optically tuning at least one of the GT resonators.

9. A method as defined in claim 7 further comprising the step of tuning at least one of the GT resonators to change its free-spectral-range.

10. A method as defined in claim 9, wherein the step of tuning includes the step of varying the response of at least one of the etalons to provide asymmetric channels.

11. A method as defined in claim 9, wherein the step of tuning includes the step of varying the response of at least one of the etalons to provide symmetric channels.

* * * * *